(12) United States Patent
Simons

(10) Patent No.: US 12,493,193 B1
(45) Date of Patent: Dec. 9, 2025

(54) MAGNIFYING DEVICE FOR PRESCRIPTION BOTTLES

(71) Applicant: Kenneth Simons, Huntsville, AL (US)

(72) Inventor: Kenneth Simons, Huntsville, AL (US)

( * ) Notice: Subject to any disclaimer, the term of this patent is extended or adjusted under 35 U.S.C. 154(b) by 314 days.

(21) Appl. No.: 18/228,726

(22) Filed: Aug. 1, 2023

(51) Int. Cl.
*G02B 27/02* (2006.01)
*G02B 25/00* (2006.01)

(52) U.S. Cl.
CPC ......... *G02B 27/028* (2013.01); *G02B 25/002* (2013.01); *G02B 27/027* (2013.01)

(58) Field of Classification Search
CPC ... G02B 27/028; G02B 27/027; G02B 25/002
USPC .......................................................... 359/802
See application file for complete search history.

(56) References Cited

U.S. PATENT DOCUMENTS

| | | | |
|---|---|---|---|
| 5,193,032 A * | 3/1993 | Hirth | G02B 25/002 359/442 |
| 5,204,775 A | 4/1993 | McDevitt | |
| 6,278,545 B1 | 8/2001 | Napier | |
| 6,621,629 B2 | 9/2003 | Blumenthal | |
| D855,309 S | 8/2019 | Ishwarbhai | |
| 2010/0133139 A1 | 6/2010 | Lowe | |
| 2020/0099414 A1 | 3/2020 | Herman | |
| 2021/0382295 A1 | 12/2021 | Booker | |

FOREIGN PATENT DOCUMENTS

CA      3019080      11/2019

* cited by examiner

*Primary Examiner* — Balram T Parbadia
*Assistant Examiner* — Mitchell T Oestreich

(57) ABSTRACT

The magnifying device for prescription bottles is an optical device. The magnifying device for prescription bottles includes an ellipsoid structure, a lens structure, and a medical bottle. The medical bottle inserts into the ellipsoid structure. The lens structure is formed in the ellipsoid structure. The lens structure magnifies the bottle label of the medical bottle.

8 Claims, 4 Drawing Sheets

MAGNIFYING DEVICE FOR PRESCRIPTION BOTTLES

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of optical devices including magnifying glasses. (G02B25/002)

SUMMARY OF INVENTION

The magnifying device for prescription bottles is an optical device. The magnifying device for prescription bottles comprises an ellipsoid structure, a lens structure, and a medical bottle. The medical bottle inserts into the ellipsoid structure. The lens structure is formed in the ellipsoid structure. The lens structure magnifies the bottle label of the medical bottle.

These together with additional objects, features and advantages of the magnifying device for prescription bottles will be readily apparent to those of ordinary skill in the art upon reading the following detailed description of the presently preferred, but nonetheless illustrative, embodiments when taken in conjunction with the accompanying drawings.

In this respect, before explaining the current embodiments of the magnifying device for prescription bottles in detail, it is to be understood that the magnifying device for prescription bottles is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the magnifying device for prescription bottles.

It is therefore important that the claims be regarded as including such equivalent construction insofar as they do not depart from the spirit and scope of the magnifying device for prescription bottles. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
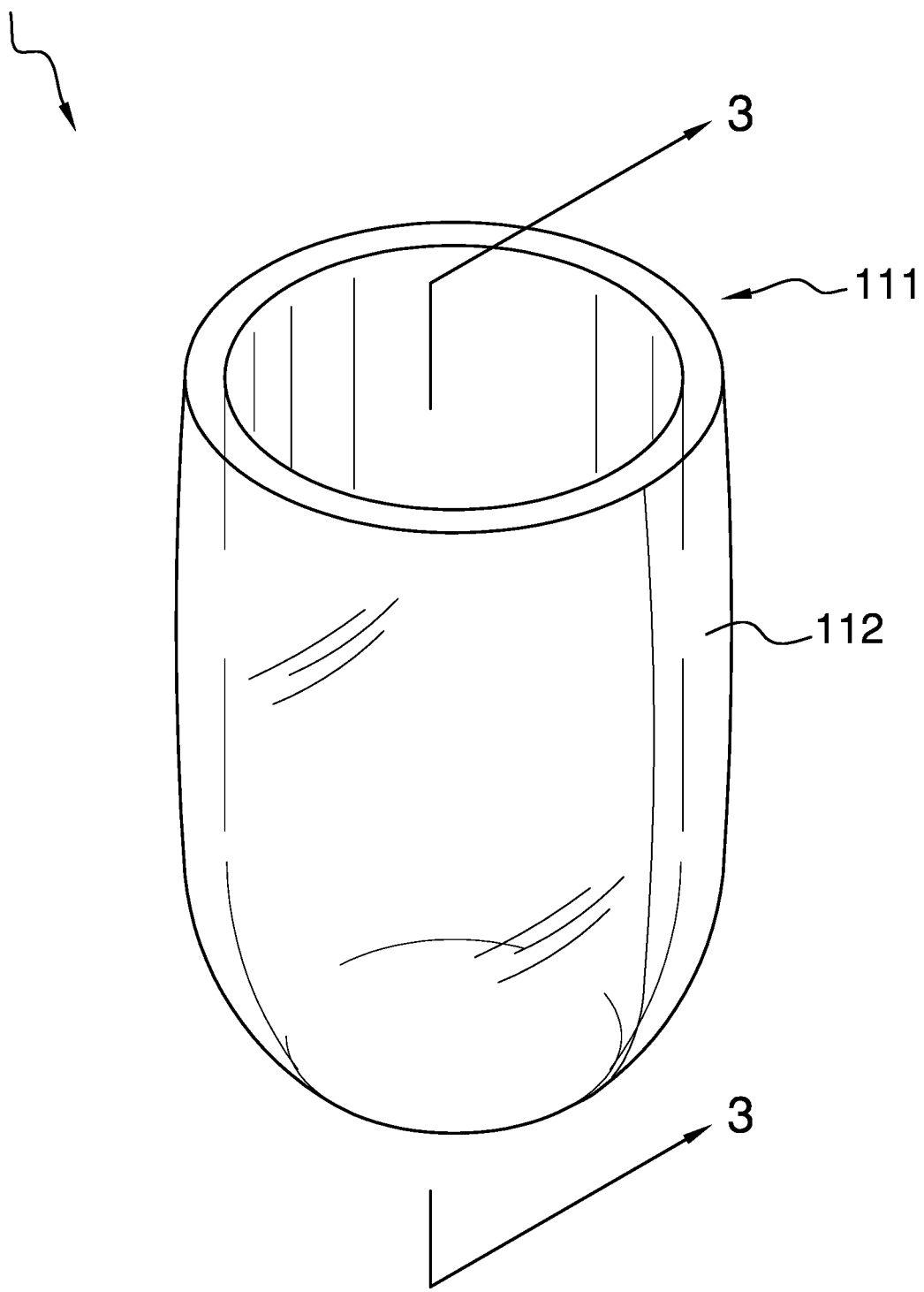
FIG. 1 is a perspective view of an embodiment of the disclosure.
Figure 2:
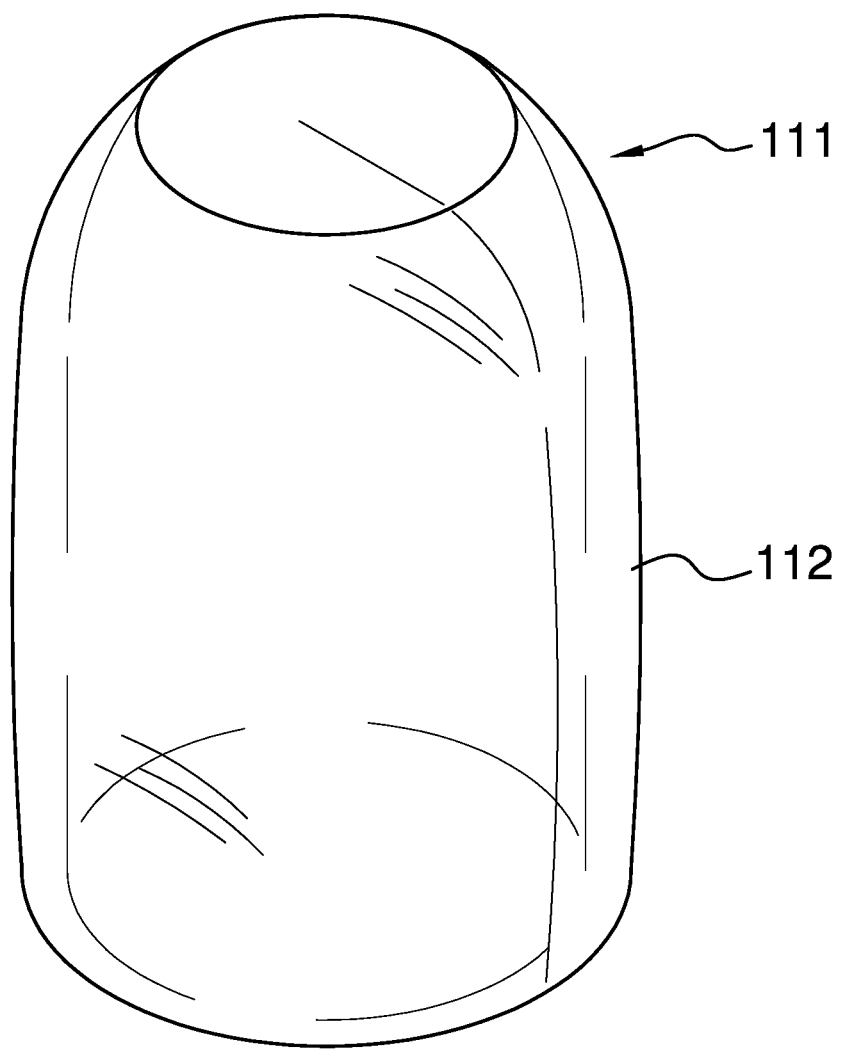
FIG. 2 is a perspective view of an embodiment of the disclosure.
Figure 3:
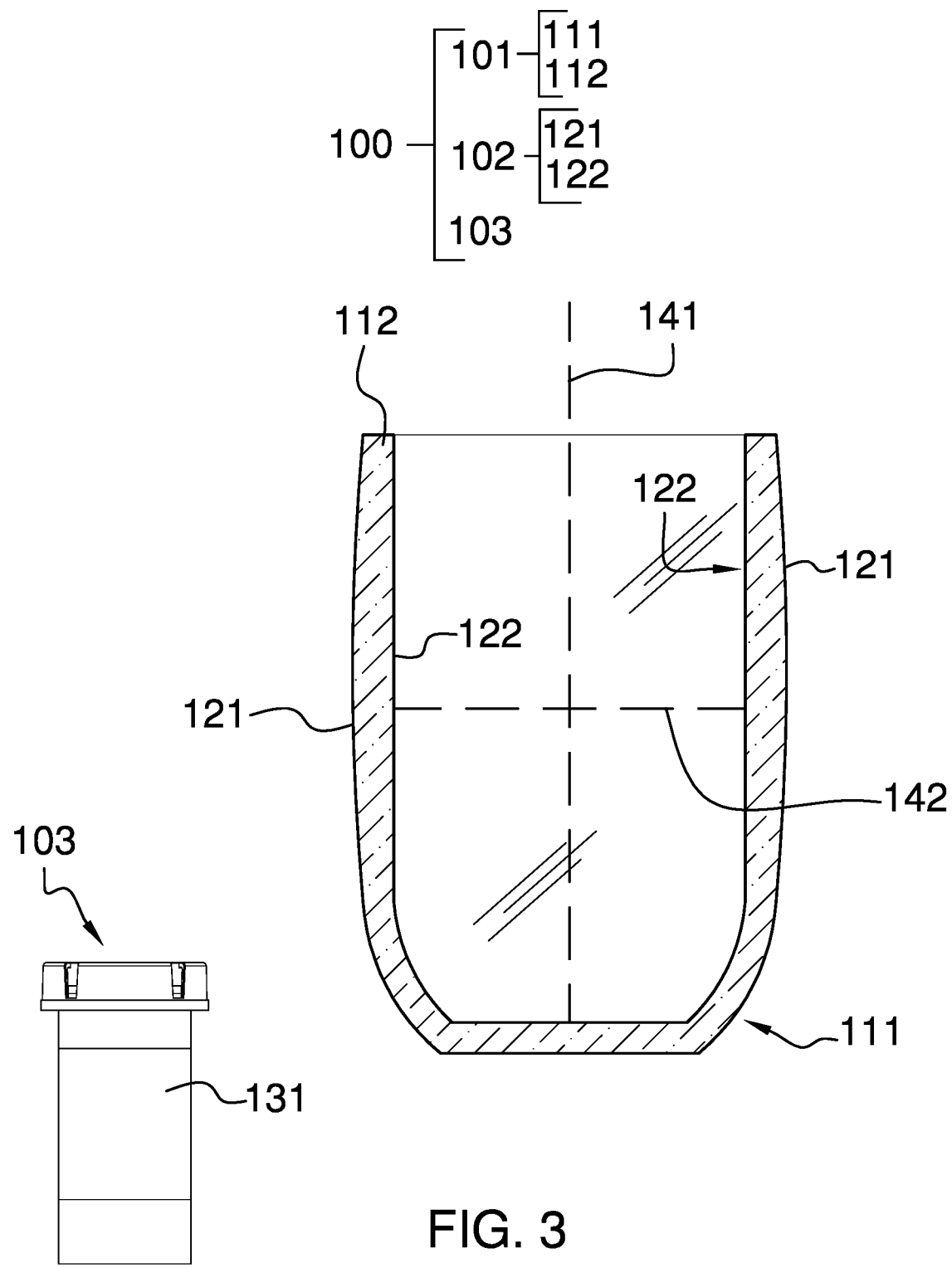
FIG. 3 is a cross-sectional view of an embodiment of the disclosure across 3-3 as shown in FIG. 1.
Figure 4:
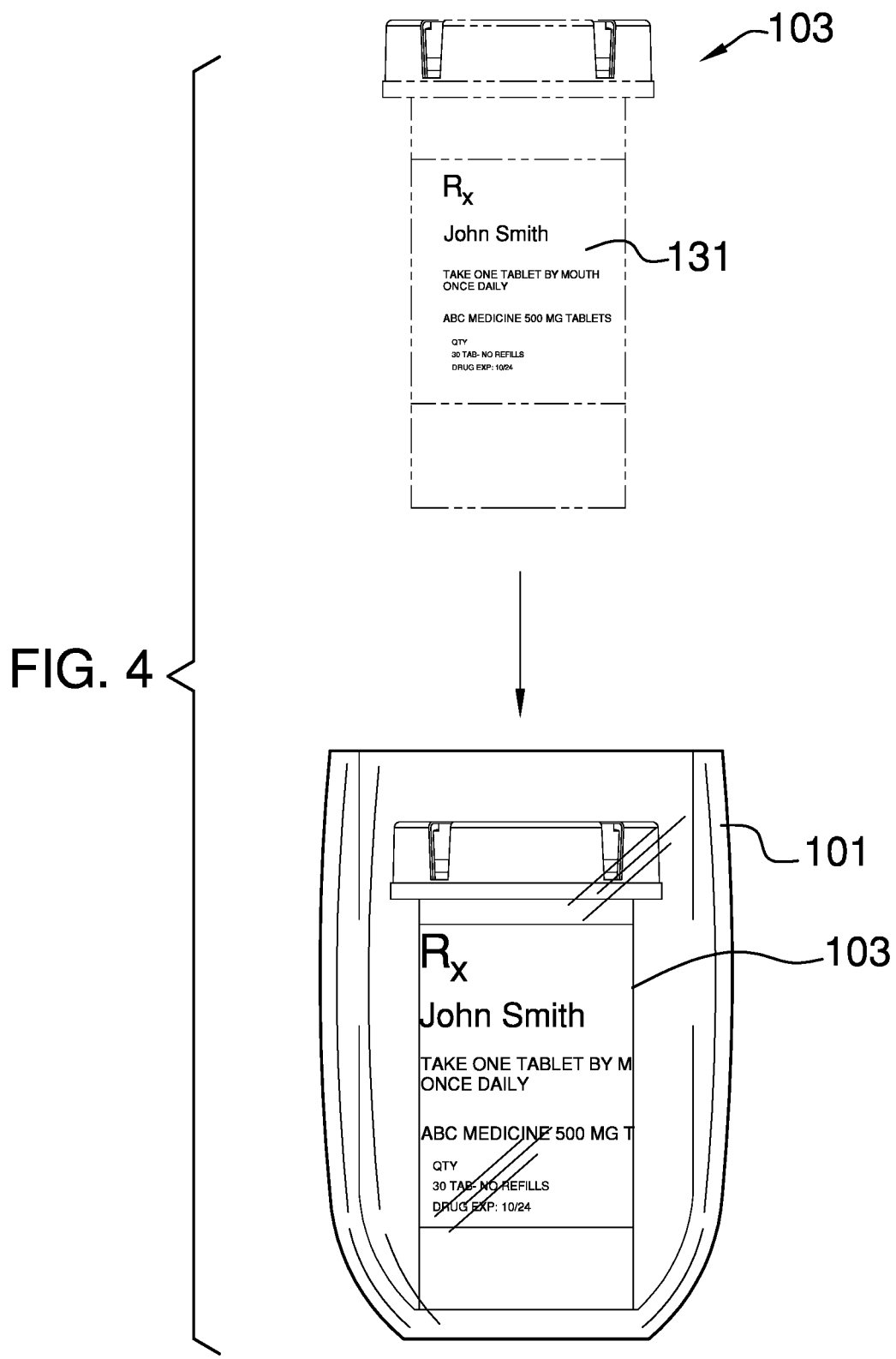
FIG. 4 is an in-use view of an embodiment of the disclosure.

Detailed reference will now be made to one or more potential embodiments of the disclosure, which are illustrated in FIGS. 1 through 4.

The magnifying device for prescription bottles 100 (hereinafter invention) is an optical device. The invention 100 comprises an ellipsoid structure 101, a lens structure 102, and a medical bottle 103. The medical bottle 103 inserts into the ellipsoid structure 101. The lens structure 102 is formed in the ellipsoid structure 101. The lens structure 102 magnifies the bottle label 131 of the medical bottle 103.

The medical bottle 103 is a container. The medical bottle 103 is a roughly prism shaped structure. The medical bottle 103 is used to store a pharmacologically active media. The medical bottle 103 comprises a bottle label 131. The bottle label 131 is a label that is attached to the exterior surface of the medical bottle 103. The bottle label 131 provides written information about the pharmacologically active media, the dosage instructions, and the identification of the patient.

The ellipsoid structure 101 is a container. The ellipsoid structure 101 is a hollow structure. The ellipsoid structure 101 is formed in the shape of a right quadric section of an ellipsoid. The ellipsoid structure 101 is a transparent structure. The ellipsoid structure 101 is sized such that the medical bottle 103 inserts into the hollow interior through the plane that bifurcates the ellipsoid structure 101. The medical bottle 103 inserts into the ellipsoid structure 101 such that the center axis of the medical bottle 103 aligns with the major axis 141 of the ellipsoid structure 101. The ellipsoid structure 101 is formed from a transparent material such that the bottle label 131 on the medical bottle 103 is visible through the ellipsoid structure 101. The ellipsoid structure further comprises an ellipsoidal section 111 and a lateral face structure 112.

The ellipsoidal section 111 is a hollow structure. The ellipsoidal section 111 is a transparent structure. The ellipsoidal section 111 forms the physical right quadric section of the ellipsoid structure 101. The ellipsoidal section 111 forms the containment structure that receives the medical bottle 103. The lateral face structure 112 forms the structure of the ellipsoidal section 111 that partially encloses the major axis of the ellipsoid structure that was bifurcated to form the right quadric section of the ellipsoidal section 111.

The ellipsoidal section 111 further comprises a major axis 141 and a minor axis 142. The major axis 141 is the major axis 141 of the ellipsoid structure that is bifurcated to form the right quadric section of the ellipsoidal section 111 of the ellipsoid structure 101. The major axis 141 is selected using the perimetrical boundary method described elsewhere in this disclosure. The major axis 141 is defined elsewhere in this disclosure. The minor axis 142 is the minor axis 142 of the ellipsoid structure that is bifurcated to form the right quadric section of the ellipsoidal section 111 of the ellipsoid structure 101. The minor axis 142 is selected using the perimetrical boundary method described elsewhere in this disclosure. The minor axis 142 is defined elsewhere in this

DISCLOSURE

The lateral face structure 112 is a symmetric structure around the major axis 141 of the ellipsoidal section 111. The lateral face structure 112 is a transparent structure. The lateral face structure 112 encloses the bottle label 131 of the medical bottle 103. The lens structure 102 is formed in the lateral face structure 112.

The lens structure 102 is an optical device. The lens structure 102 is formed in the transparent surface of the ellipsoid structure 101. The lens structure 102 forms a magnifying device that increases the apparent size of the bottle label 131 of the medical bottle 103. The lens structure 102 further comprises an exterior convex surface 121 and an interior convex surface 122.

The exterior convex surface 121 is a first surface of the two surfaces of the lens structure 102. The exterior convex surface 121 is formed on the exterior surface of the lateral face structure 112 of the ellipsoid structure 101.

The interior convex surface 122 is a second surface of the two surfaces of the lens structure 102. The interior convex surface 122 is formed on the interior surface of the lateral face structure 112 of the ellipsoid structure 101. The interior convex surface 122 aligns with the exterior convex surface 121 to form a single convex lens structure. The interior convex surface 122 are positioned such that the convex surface of the exterior convex surface 121 are positioned such that the convex surface of the exterior convex surface 121 faces in the opposite direction from the convex surface of the interior convex surface 122.

The following definitions were used in this disclosure:

Bottle: As used in this disclosure, a bottle is a roughly prism-shaped container that is used to contain a pharmacologically active media.

Center, Major, Minor, and Thickness Dimensions: As used in this disclosure, the center dimension, the major dimension, the minor dimension, and the thickness each refer to the span of a length associated with a structure selected from the group consisting of a prism structure and a disk structure. The center dimension is the span of the length of the center axis of the selected structure. The thickness is an alternate name given to the center dimension when the selected structure is a disk structure. The major dimension is the span of the length of the major axis of the perimetrical boundary that contains the selected structure. The minor dimension is the span of the length of the minor axis of the perimetrical boundary that contains the selected structure. The terms center dimension, the major dimension, the minor dimension, and the thickness are also used to describe one or more linear axes of direction associated with the selected structure. Always use major and minor axes, perimetrical boundary, and full prism.

Concave: As used in this disclosure, concave is used to describe: 1) a surface that resembles the interior surface of a sphere; or, 2) a function with a curvature structure wherein a chord that connects any two points of the function will be lesser than (graphically below) or equal to the value of the function at any point along the chord.

Convex: As used in this disclosure, convex is used to describe: 1) a surface that resembles the outer surface of a sphere; or, 2) a function with a curvature structure wherein a chord that connects any two points of the function will be greater than (graphically above) or equal to the value of the function at any point along the chord.

1 Ellipsoid: As used in this disclosure, an ellipsoid is a three-dimensional geometric surface through which all planar surfaces are from either circles or ellipses. An ellipsoid is a type of quadric surface. The equation for an ellipsoid is: $(x\wedge 2/a)+(y\wedge 2/b)+(z\wedge 2/c)=d$ wherein a, b, c, and d are constants.

Image: As used in this disclosure, an image is an optical representation or reproduction of an indicia or of the appearance of something or someone. See indicia sentiment optical character recognition. See Label and Pattern.

Indicia: As used in this disclosure, the term indicia refers to a set of markings that identify a sentiment. See sentiment.

Label: As used in this disclosure, a label is a structure that attaches to an object. The label displays an image of an indicia that is visibly displayed by the object. The indicia of the label provides a sentiment about the object to which the label attaches. The term tag is a synonym for a label.

Lens: As used in this disclosure, a lens is a transparent substance through which electromagnetic radiation can pass. The lens refracts the electromagnetic radiation as it passes through the lens. A lens may or may not be formed with curved surfaces that are used to concentrate or disperse the electromagnetic radiation that travels through the lens. A lens can also project a focused image on a surface known as a virtual image. A lens may also be used to change the apparent size of the virtual image. A magnifying lens (also known as a magnifying glass) is a lens that increase the apparent size of a virtual image. A contact lens is a lens that is worn directly on the eye of a patient.

Magnify: As used in this disclosure, the magnify means to increase the apparent size of an object through the use of an optical device.

Major and Minor Axes: As used in this disclosure, the major and minor axes refer to a pair of perpendicular axes that are defined within a structure. The length of the major axis is always greater than or equal to the length of the minor axis. The major axis forms the longest symmetric bifurcation of a structure selected from the group consisting of: a) the structure; or, b) the perimetrical boundary of the structure. The major and minor axes intersect at the center of the structure. The major axis is always parallel or perpendicular to an edge of a rectangular or rectilinear structure.

Perimetrical Boundary: As used in this disclosure, a perimetrical boundary is a hypothetical rectangular block that contains an object. Specifically, the rectangular block selected to be the perimetrical boundary is the rectangular block with the minimum volume that fully contains the object. In a two-dimensional structure, the perimetrical boundary is the rectangle with the minimum surface area. See Prismatic Perimetrical Boundary and Cylindrical Perimetrical Boundary Pharmacologically Active Media: As used in this disclosure, a pharmacologically active media refers to a chemical substance that has a biochemical or physiological effect on a biological organism.

Quadric Section: As used in this disclosure, a quadric section refers either one of the two objects formed by the bifurcation of a quadric surface by a bifurcating plane that passes through the center axis of the structure contained by quadric surface. A right quadric section occurs when the bifurcating plane perpendicularly intersects the major axis of the quadric surface. A quadric semi-section occurs when the bifurcating plane contains the major axis of the quadric surface. The angle of the quadric section is the angle formed between the bifurcating plane and the center axis of the quadric surface.

Quadric Surface: As used in this disclosure, a quadric surface is a three-dimensional surface that varies in the three Cartesian coordinates in an algebraically defined manner that is related to conic sections. Euclidian planes as well as the surfaces of ellipsoids, spheres, paraboloids, and cones are examples of quadric surfaces. The Euclidian plane is technically considered a degenerate form of a quadric surface but, unless specifically stated otherwise within this disclosure, is explicitly included in this definition. Quadric surfaces are described by the general algebraic form: $Ax^2+By^2+Cz^2+Dxy+Exz+Fyz+Gx+Hy+Iz+J=0$.

Sentiment: As used in this disclosure, a sentiment refers to a symbolic meaning or message that is communicated through the use of an object or an image, potentially including a text based image. See image and optical character recognition.

Sleeve: As used in this disclosure, a sleeve is a tube like covering that is placed over a rod, shaft or other cylindrical object.

Transparent: As used in this disclosure, transparent refers to a material that allows light to pass through the material without significant scattering such that an object can be clearly seen through the material.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A magnifying device for prescription bottles comprising
    a non-spherical structure, a lens structure, and a medical bottle;
    wherein the medical bottle inserts into the non-spherical structure, and the lens structure magnifies the medical bottle;
    wherein the lens structure is formed in the non-spherical structure;
    wherein the non-spherical structure further comprises a non-spherical section;
    wherein the non-spherical section forms the containment structure that receives the medical bottle;
    wherein the non-spherical section is a hollow structure and transparent structure;
    wherein the non-spherical section forms a section of the non-spherical structure;
    wherein the non-spherical section further comprises a major axis and a minor axis;
    wherein the major axis is the major axis of the non-spherical structure that is bifurcated to form the section of the non-spherical section of the non-spherical structure;
    wherein the minor axis is the minor axis of the non-spherical structure that is bifurcated to form the section of the non-spherical section of the non-spherical structure.

2. The magnifying device for prescription bottles according to claim 1
    wherein the magnifying device for prescription bottles is an optical device;
    wherein the lens structure magnifies the medical bottle.

3. The magnifying device for prescription bottles according to claim 2
    wherein the medical bottle is a container;
    wherein the medical bottle is used to store a pharmacologically active media;
    wherein the medical bottle comprises a bottle label;
    wherein the bottle label is a label that is attached to the exterior surface of the medical bottle.

4. The magnifying device for prescription bottles according to claim 3
    wherein the non-spherical structure is a container;
    wherein the non-spherical structure is a hollow structure;
    wherein the non-spherical structure is a transparent structure;
    wherein the non-spherical structure is sized such that the medical bottle inserts into the hollow interior through the plane that bifurcates the non-spherical structure;
    wherein the medical bottle inserts into the non-spherical structure such that a center axis of the medical bottle aligns with the major axis of the non-spherical structure.

5. The magnifying device for prescription bottles according to claim 4
    wherein the lens structure is formed in a lateral face structure;
    wherein the lens structure is an optical device;
    wherein the lens structure forms a magnifying device that increases the apparent size of the bottle label of the medical bottle;
    wherein the lateral face structure encloses the bottle label of the medical bottle.

6. The magnifying device for prescription bottles according to claim 5
    wherein the lens structure further comprises an exterior convex surface and an interior convex surface;
    wherein the exterior convex surface is a first surface of two surfaces of the lens structure;
    wherein the interior convex surface is a second surface of the two surfaces of the lens structure.

7. The magnifying device for prescription bottles according to claim 6
    wherein the lateral face structure forms the structure of the non-spherical section that partially encloses the major axis of the non-spherical structure that was bifurcated to form the right quadric section of the ellipsoidal non-spherical section;

wherein the lateral face structure is a symmetric structure around the major axis of the non-spherical section;

wherein the lateral face structure is a transparent structure.

8. The magnifying device for prescription bottles according to claim 7 wherein the exterior convex surface is formed on the exterior surface of the lateral face structure of the non-spherical structure;

wherein the interior convex surface is formed on the interior surface of the lateral face structure of the non-spherical structure;

wherein the interior convex surface aligns with the exterior convex surface to form a single convex lens structure;

wherein the interior convex surface is positioned such that the convex surface of the exterior convex surface are positioned such that the convex surface of the exterior convex surface faces in the opposite direction from the convex surface of the interior convex surface.

\* \* \* \* \*